(12) United States Patent
Scholze

(10) Patent No.: US 7,551,056 B2
(45) Date of Patent: Jun. 23, 2009

(54) USE-AUTHORIZATION DEVICE FOR SECURITY-RELATED APPLICATIONS

(75) Inventor: Steffen Scholze, Hamburg (DE)

(73) Assignee: NXP B.V., Eindhoven (NL)

( * ) Notice: Subject to any disclaimer, the term of this patent is extended or adjusted under 35 U.S.C. 154(b) by 625 days.

(21) Appl. No.: 10/582,836

(22) PCT Filed: Dec. 6, 2004

(86) PCT No.: PCT/IB2004/052672
§ 371 (c)(1),
(2), (4) Date: Jun. 14, 2006

(87) PCT Pub. No.: WO2005/060153
PCT Pub. Date: Jun. 30, 2005

(65) Prior Publication Data
US 2007/0118755 A1    May 24, 2007

(30) Foreign Application Priority Data
Dec. 15, 2003    (EP) .................................. 03104686

(51) Int. Cl.
*G06K 19/00* (2006.01)
(52) U.S. Cl. .................. 340/5.2; 340/5.26; 380/29; 380/30; 380/46
(58) Field of Classification Search .............. 340/5.2, 340/5.26; 380/29, 30, 46
See application file for complete search history.

(56) References Cited

U.S. PATENT DOCUMENTS

| | | | | |
|---|---|---|---|---|
| 6,226,743 B1 * | 5/2001 | Naor et al. | ................... | 713/177 |
| 7,346,586 B1 * | 3/2008 | Walmsley | ................... | 705/64 |
| 7,363,494 B2 * | 4/2008 | Brainard et al. | ............. | 713/168 |
| 7,512,230 B2 * | 3/2009 | She | ............................. | 380/28 |
| 2003/0105964 A1 * | 6/2003 | Brainard et al. | ............. | 713/178 |
| 2003/0188170 A1 * | 10/2003 | Bidan et al. | ................. | 713/182 |
| 2008/0077795 A1 * | 3/2008 | MacMillan | ................. | 713/169 |

FOREIGN PATENT DOCUMENTS

DE            44 11 449          3/1995

\* cited by examiner

*Primary Examiner*—Daniel Wu
*Assistant Examiner*—Bradley E Thompson

(57) ABSTRACT

This description is given of a use-authorization device for security-related applications, in particular access control to secure areas or securing vehicles with a user operated key unit for generating consecutive, alternating user code information which exhibits a sequence of consecutive function values $v_{i+1}=F(v_i, \text{const})$ for $i=0, \ldots, N$ through the repeated use of a one-way function $F(v_i, \text{const})$, which function values are used in inverse order to the sequence formation to create the consecutive user code information, and an application-sided processing unit for determining actual authorization information which is dependent upon the user code information received from the key unit and for performing a use-authorization checking process by comparing this actual authorization information with target authorization information saved in the application, as well as for generating use-release information depending on the result of the comparison, wherein the target authorization information has a function value v; which has been transferred from the user code information processed during the previous positive use-authorization operation. The special feature of the invention is that there is a certain number of levels G provided, with at least one support point and one intermediate value, from which a certain number of iterative function value calculations can be performed in each level by means of the one-way function $F(v_i, \text{const})$ wherein there are $G=L(N)/b$ levels, with N as the starting value, L(N) as the number of bits required for representing N in the dual system and b as the basis.

11 Claims, 4 Drawing Sheets

USE-AUTHORIZATION DEVICE FOR SECURITY-RELATED APPLICATIONS

The invention relates to a use-authorization device for security-related applications, in particular access control to secure areas or for securing vehicles with a user-end key unit for generating consecutive, alternating user code information which has a sequence of consecutive function values $v_{i+1}=F(v_i,\text{const})$ for $i=0, \ldots, N$ through the repeated use of a one-way function $F(v_i,\text{const})$, which function values are used in inverse order to the sequence formation to create the consecutive user code information, and an application-end processing unit for determining actual authorization information which is dependent upon the user code information received from the key unit and for performing a use-authorization checking operation by comparing this actual authorization information with the application-end desired authorization information, as well as for generating use-release information depending on the result of the comparison, wherein the desired authorization information has a function value $v_i$ which has been transferred from the user code information processed during the previous positive use-authorization operation.

Such a use-authorization device is known, for example, from DE 44 11 449 C1, wherein the use-authorization device described there is provided securing a vehicle and as a portion of a vehicle immobilizer.

Such a use-authorization device works on the basis of a so-called alternating code method, in which security against unauthorized use of the security-related application after interception of the transmitted code information is increased by virtue of the fact that the code information changes every time the use-authorization is checked, also called the authentication process. This code change can only be realized with the aid of unidirectional code information transmissions from the key end to the application end such that secret information about a base number or a starting value and an algorithm are saved both at the key end and at the application end, according to which algorithm sequential code information can be derived from the starting value. In this way, use-authorization can be checked at the application end by comparing the code information which is produced at the key end with the code information which is transmitted at the key end.

For the purposes of the unidirectional code information transmission, a one-way function $F(v_i,\text{const})$ is specified which can only be inverted with considerable time and/or financial outlay, if at all. A high-grade, non-linear Boolean function or a hash function are possibilities here, in particular. Based on a starting value of $v_0$, new function values can be calculated iteratively by means of $$v_{i+1}=F(v_i,\text{const}), I=(0,\ldots,N) \tag{1}$$

only the last of which is a variable parameter, wherein the parameter const is a constant and/or the function value for a specific index i and/or can only be known to the key unit and the access control unit. The function values are used in descending order from $v_{max}$ to $v_0$ for the use-authorization unit. A suitable implementation requires the values $v_0$ and const in order to calculate all the function values between $v_0$ and $v_{max}$ in ascending order. The starting values $v_0$ and const must be known at both the key unit end and at the security-related application end.

It should be pointed out for the sake of completeness at this point that the use-authorization device of the type described before is not only limited to a vehicle immobilizer; another important area of use is, for example, access control systems to all types of secure areas in which the key has to authorize itself to the lock.

Generally speaking, if there is a large number of authorizations intended (e.g. 100,000), it is not expedient to save all the requisite values in the key unit. Consequently, the key unit must have a method for calculating the output value which is currently required from equation (1) and from a starting value $v_0$ or several values $v_i$, with knowledge of the function F. A general drawback with simple approaches to implementing the use-authorization unit described above is that the outlay in terms of computing time and/or memory space for calculating the individual consecutive output values during runtime fluctuates considerably, which makes it difficult or even impossible to use in systems with limited resources. Technology with scalable cost in terms of memory space and computing time is indispensable for systems of this type. In addition, the system should be in operation for a period of time, to be defined precisely beforehand, between the transmission of two consecutive output values in order to be able to synchronize various system parameters accordingly.

Consequently, in the case of a use-authorization device of the type specified at the start, the invention proposes providing a certain number of levels G, wherein a certain number of iterative function value calculations can be performed in each level by means of the one-way function $F(v_i,\text{const})$, wherein there are $G=\lceil L(N)/b \rceil$ levels, wherein N is the starting value, L(N) is the number of bits required for representing N in the dual system and b is the basis for defining the number of levels and the number of function value calculations required in each iteration step ($\lceil x \rceil$ is the smallest integer greater than or equal to x).

The invention is suitable for realizing the unidirectional encryption method, described above, to particularly advantageous effect on devices with limited resources in terms of volatile and/or non-volatile memory space, e.g. in the RAM and EEPROM and/or computer performance, such as a programmable or non-programmable, so-called embedded controller. When the invention is used on embedded low-cost controllers (for remote keyless entry in the car-manufacturing industry, for example), there are particularly positive benefits, such as the short development time of the implementation, the consistency of the method in terms of memory space requirements during runtime, the scalability in terms of memory requirements and execution time and the robust response to interruptions during runtime (such as interruptions in the power supply in the case of inductively operated key units). The same also applies to an implementation of the invention as a hard-wired logic device.

There is preferably a support point s(i) where i $(1, \ldots, G)$ provided for each level. Here, some function values are set up as so-called support points which are either system defaults or which are calculated by the actual key unit by means of iteration before the algorithm starts. The computational workload can be reduced with the aid of other support points per level or only for certain levels.

The values for the support points s(i) are expediently determined from the equation $$s(i) = N - \sum_{j=1}^{i} (2^b)^j \tag{2}$$

wherein N is the starting value, which is defined in the equation (1), of the output values. Ordinarily, no function values can be calculated for negative indices, which limits the application of the equation (2) to support points with a positive index.

The parameter b should preferably be adapted for a specified number of support points in such a way that the function value calculations per use authorization are minimized.

Ordinarily, starting from the current support point s(i), there should be a certain number of function values calculated in each level in descending order and saved as intermediate values. An intermediate value for the support point in a level should be reset successively in this level once this intermediate value, as a new support point, has been transferred to the next level down.

In order to permit any staring values N, the corresponding requisite intermediate values can either be supplied as well or be predefined as a starting value $N=(2^b)^G$, in which case the method can be started with $(2^b)^G$ and be performed up to the index i=N.

Alternatively, it is also conceivable, however, that $$N \in \{(2^b)^{G-1}, \ldots, (2^b)^G - 1\} \quad (3)$$

applies to the starting value which allows the unrestricted use of equation (2) for the calculation of the support points. This can be achieved through suitable system defaults.

It will be expedient if there are several buffers provided for saving intermediate values which are calculated from the function values. In order to reduce write operations while intermediate values are being saved, several buffers can be provided per level which are written to and read on a rotating basis and are, thus, designed as an FIFO memory.

These and other aspects of the invention are apparent from and will be elucidated with reference to the embodiments described hereinafter.

Figure 1:
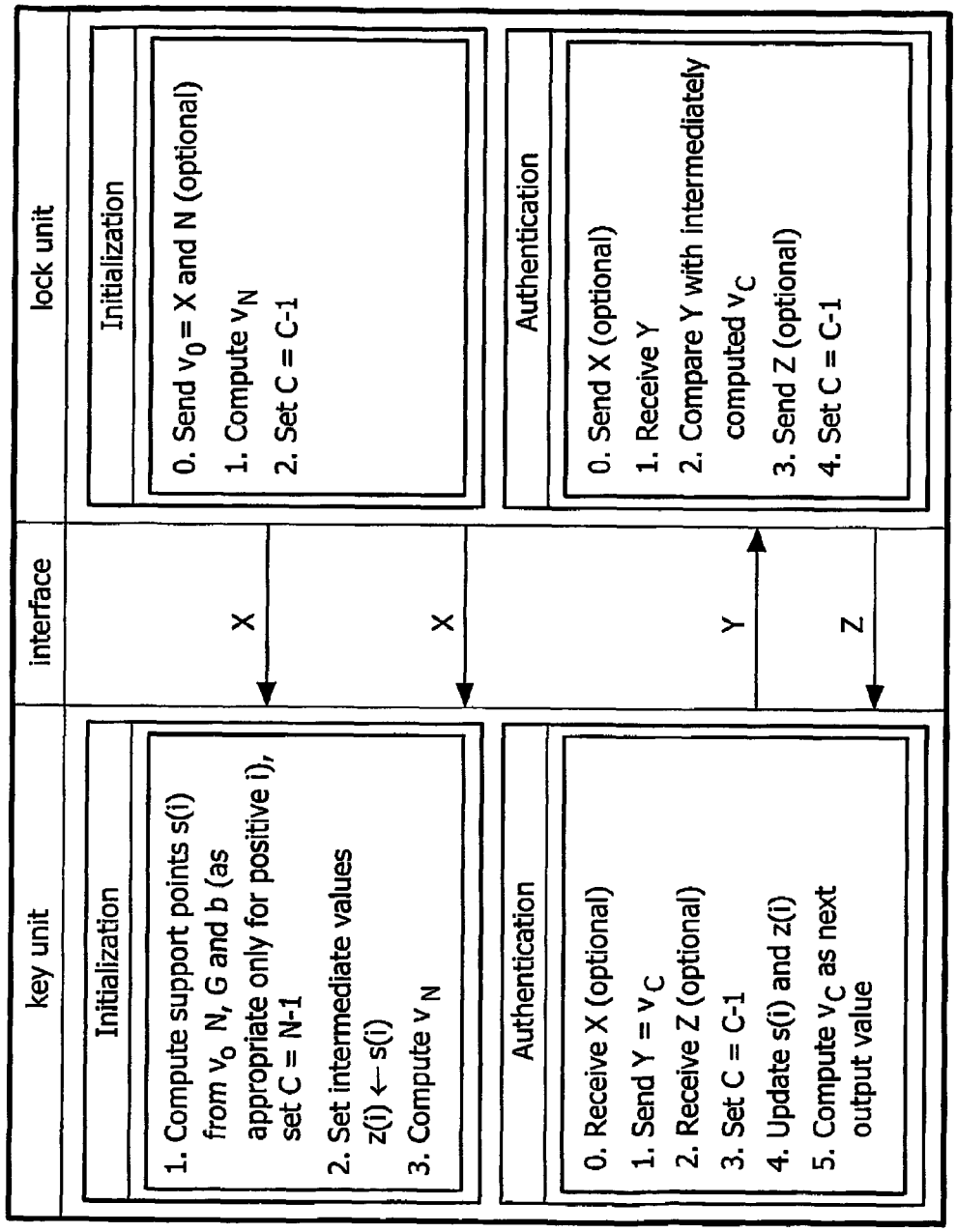
FIG. 1 shows a block diagram of a preferred embodiment of the use-authorization system in accordance with the invention.

The description below relates to a preferred embodiment of a use-authorization system, which is illustrated diagrammatically in FIG. 1, on the basis of a method implemented therein, which results in a constant need for working memory (e.g. RAM and/or EEPROM) between the output of two consecutive values. Based on the number of support points used, it is scalable whether less execution time is required when working memory requirements rise, or vice versa, while the need for program memory (ROM) remains virtually unaffected by this.

As previously described, there is a default one-way function $F(v_i, \text{const})$ which cannot be inverted or which can only be inverted with considerable outlay (e.g. a high-grade, non-linear Boolean function or a hash function). Based on a starting value of $v_0$, new function values $v_i$ can be calculated iteratively by means of $$v_{i+1} = F(v_i, \text{const}), \quad I = (0, \ldots, N) \quad (1)$$

wherein only the last function value is a variable parameter. The parameter const may be a constant and/or the function value for a specific index i or a value which is only known to this use-authorization device.

The object is to output the function values in descending order from $v_{max}$ to $v_0$. As the inverse function of F is not known, an implementation requires $v_0$ and const in order to calculate all the values between $v_0$ and $v_{max}$. The method described here requires some function values, as so-called support points, which either already exist or which are calculated from the given starting values by means of iteration before the algorithm, which is described here, starts.

The function values $v_i$ have to be output for indices i from N to 0 wherein, as described above, only $v_{i+1} = F(v_i, \text{const})$ can be calculated on each occasion. L(N) is the number of bits required to display N in the dual system and b is the basis, which determines how many support points are absolutely necessary, as well as the maximum number of iterative function calculations required per level. As the total implementation is based on the index i, the value of the basis b can also be interpreted as the number of consecutive bits in i: Bits 0 to b form the counter for level 1, bits b+1 to 2b form the counter for level 2, and so on. The actual number of levels is calculated from $$G = \left\lceil \frac{L(N)}{b} \right\rceil \quad (3)$$

which also corresponds at the same time to the number of support points which are absolutely necessary as each level requires at least one support point. These support points are referred to hereinafter as s(i) where i=(1, ..., G) for each of the levels i.

A distinction can be made between two cases for the values of the support points:

Case 1: In the case of $N = (2^b)^G$, $$s(g) = N - \sum_{j=1}^{g} (2^b)^j \text{ where } g = (1, \ldots, G).$$

Consequently, s(G) is negative. If this value cannot be calculated, this causes a slight change in the algorithm described below, although this does not affect the fundamental sequence.

Case 2: In the case of $N \in \{(2^b)^{G-1}, \ldots, (2^b)^G - 1\}$, it is sufficient to simulate the algorithm described below until the index N is reached and to output the intermediate values and support points saved then and to use them as initialization values.

If case 1 above applies with b=3 and $N=(2^3)^4=4096$, then G=4, and the support points are ascertained using equation (3):

$s(1) = v_{N-8} = v_{4088}$ $s(2) = v_{N-72} = v_{4024}$ $s(3) = v_{N-584} = v_{3512}$ $s(4) = v_{N-4680} = v_{-584}$ s(4) applies here provided it cannot be calculated from $v_0$. Following the output of the first value $v_{N=4096}$, the value of the counter $$C \text{ is } C = N - 1 = 4095 = (\underbrace{111}_{=c(4)} \cdot \underbrace{111}_{=c(3)} \cdot \underbrace{111}_{=c(2)} \cdot \underbrace{111}_{=c(1)})_b,$$

i.e. each of the counters $c(i)$ of the individual basis $b=3$ levels are $c(i)=(111)_b=7$.

Figure 2:
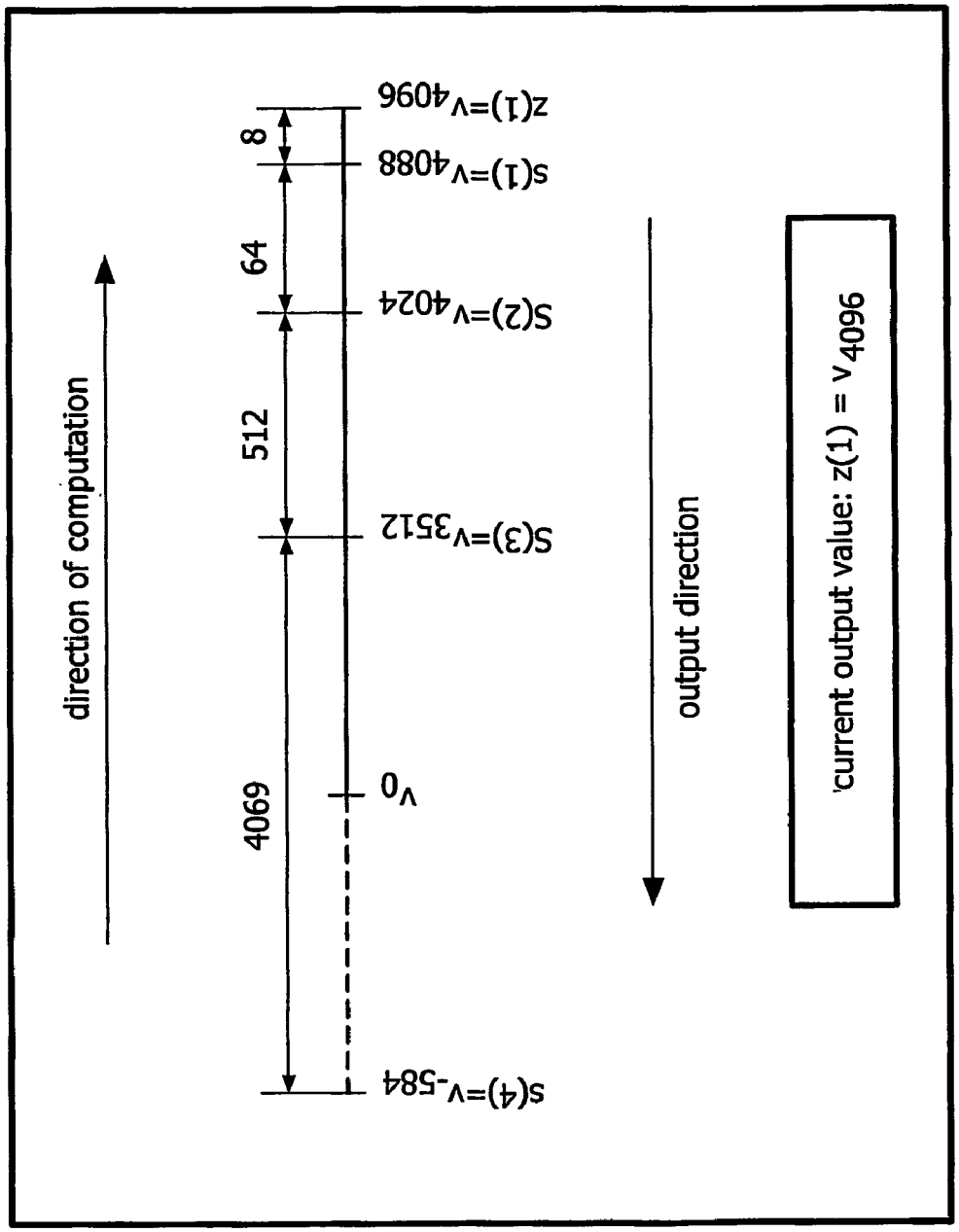
FIG. 2 shows a diagram illustrating the arrangement of support points and intermediate values, as well as the spaces between the individual support points following the initialization of the use-authorization system in FIG. 1.

The arrangement of the support points and of the spaces between the individual support points, as described above, is shown diagrammatically in FIG. 2 and, at the same time, represents the basis for the sample algorithm described below.

The second output value should now be calculated based on the configuration illustrated in FIG. 1. In accordance with the counter values $c(i)$, the intermediate values $z(i)$ are calculated by the support points $s(i)$ by means of the iterative application of $F(v_i)$. They are given by:

$s(4)=v_{-584} \, z(4)=v_{-577} \, c(4)=7$ $s(3)=v_{3512} \, z(3)=v_{3519} \, c(3)=7$ $s(2)=v_{4024} \, z(2)=v_{4031} \, c(2)=7$ $s(1)=v_{4088} \, z(1)=v_{4095} \, c(1)=7$ $C=4095=(111.111.111.111)_b$ $z(1)$ is the second output value sought here.

In order to calculate the third output value, the whole process is repeated with the level counters $c(4)=7$, $c(3)=7$, $c(2)=7$ and $c(1)=6$ which are derived from the counter $$C = 4094 = (\underbrace{111}_{=c(4)} \cdot \underbrace{111}_{=c(3)} \cdot \underbrace{111}_{=c(2)} \cdot \underbrace{110}_{=c(1)})_b.$$

The intermediate values $z(i)$, which are changed accordingly, are used in all levels apart from level 1 as starting values instead of $s(i)$. $s(1)$ is always used in level 1, however. This gives rise to the following for the intermediate values:

$s(4)=v_{-584} \, z(4)=v_{-570} \, c(4)=7$ $s(3)=v_{3512} \, z(3)=v_{3526} \, c(3)=7$ $s(2)=v_{4024} \, z(2)=v_{4038} \, c(2)=7$ $s(1)=v_{4088} \, z(1)=v_{4094} \, c(1)=6$ $C=4094=(111.111.111.110)_b$ and the desired output value appears in $z(1)$. The following apply once a further six output values have been calculated:

$s(4)=v_{-584} \, z(4)=v_{-528} \, c(4)=7$ $s(3)=v_{3512} \, z(3)=v_{3568} \, c(3)=7$ $s(2)=v_{4024} \, z(2)=v_{4080} \, c(2)=7$ $s(1)=v_{4088} \, z(1)=v_{4088} \, c(1)=0$ $C=4088=(111.111.111.000)_b$

Figure 3:
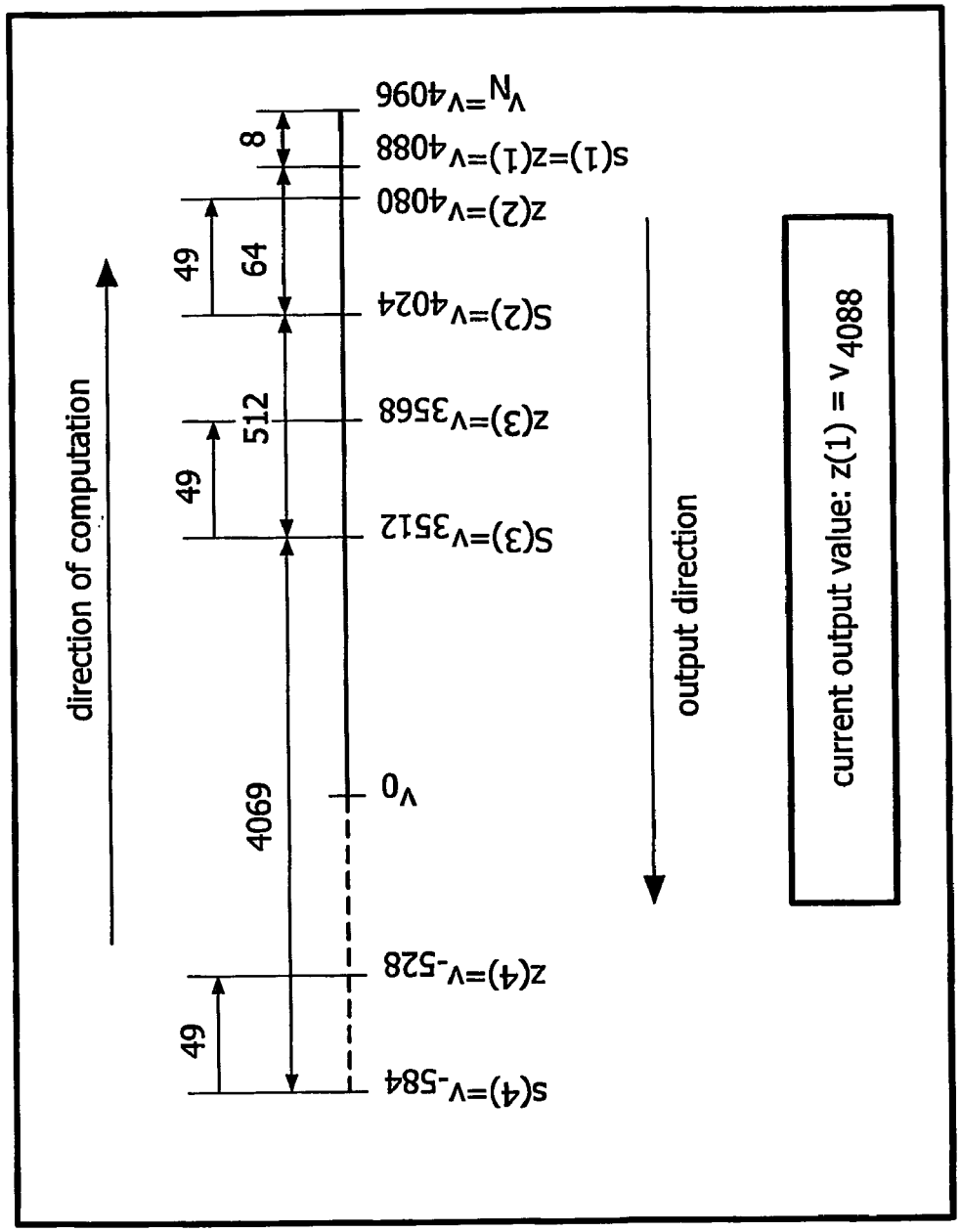
FIG. 3 shows a diagram illustrating the arrangement of support points and intermediate values, as well as the spaces between the individual support points during the output of the eighth value.

Thus, the levels are greater than 1 for each output value in accordance with its level counter $c(i)$ and are preceded each time by seven iterations of function F. The respective output value is calculated in level 1, wherein reference has been made to the current counter $c(1)$ to indicate the number of iterations of F, based on $s(1)$. This status is illustrated in FIG. 3.

In order to calculate the value output next for $C=4087=(111.111.110.111)_b$, $s(1)$ must be replaced following the output of $v_{4088}$. The method is devised in such a way that the value being sought automatically appears in $z(2)$ as soon as the counter shows $c(1)=0$. Thus, $s(1):=z(i)$ is set, and $z(2):=s(2)$ is reset to the original value again, yielding the following after the calculation of the next output value:

$s(4)=v_{-584} \, z(4)=v_{-521} \, c(4)=7$ $s(3)=v_{3512} \, z(3)=v_{3575} \, c(3)=7$ $s(2)=v_{4024} \, z(2)=v_{4030} \, c(2)=6$ $s(1)=v_{4080} \, z(1)=v_{4087} \, c(1)=7$ $C=4087=(111.111.110.111)_b$

Figure 4:
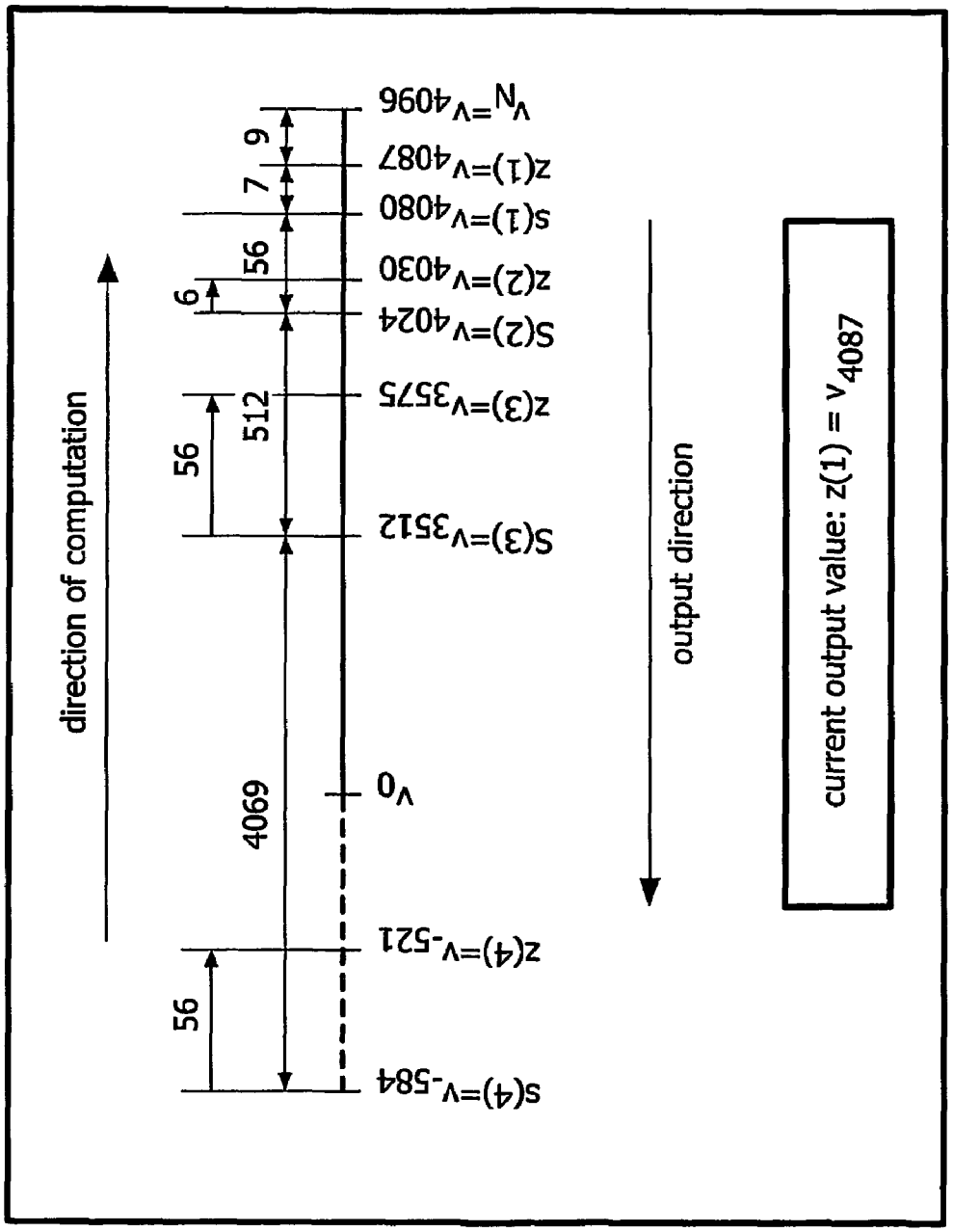
FIG. 4 shows a diagram illustrating the arrangement of support points and intermediate values, as well as the spaces between the individual support points during the output of the ninth value.

FIG. 4 illustrates this status following the first underflow.

The steps described above for outputting the values for $C=4087$ to $C=4080$ can now be repeated successively wherein $c(4)=7$, $c(3)=7$ and $c(2)=6$. In the case of $C=4080$, the following status applies:

$s(4)=v_{-584} \, z(4)=v_{-472} \, c(4)=7$ $s(3)=v_{3512} \, z(3)=v_{3617} \, c(3)=7$ $s(2)=v_{4024} \, z(2)=v_{4066} \, c(2)=6$ $s(1)=v_{4080} \, z(1)=v_{4080} \, c(1)=0$ $C=4080=(111.111.110.000)_b$

Each time an underflow occurs in $c(1)$, the replacement $s(1):=z(i)$ and $z(2):=s(2)$ takes place. The following apply when the counter shows $C=4032$:

$s(4)=v_{-584} \, z(4)=v_{-136} \, c(4)=7$ $s(3)=v_{3512} \, z(3)=v_{3960} \, c(3)=7$ $s(2)=v_{4024} \, z(2)=v_{4024} \, c(2)=0$ $s(1)=v_{4032} \, z(1)=v_{4032} \, c(1)=0$ $C=4032=(111.111.000.000)_b$

Consequently, apart from the existing $c(1)$ underflow, an underflow also occurs at $c(2)$ in the next step. Due to the design, the new value for $s(2)$ is in the intermediate value $z(3)$ for the next level up. $s(2):=z(3)$ and $z(2):=s(2)$, as well as $s(1):=z(2)$ and $z(1):=s(1)$ are then set accordingly. As a result, the following then apply for $C=4031$:

$s(4)=v_{-584} \, z(4)=v_{-129} \, c(4)=7$ $s(3)=v_{3512} \, z(3)=v_{3518} \, c(3)=6$ $s(2)=v_{3960} \, z(2)=v_{3967} \, c(2)=7$ $s(1)=v_{4024} \, z(1)=v_{4032} \, c(1)=7$ $C=4031=(111.110.111.111)_b$

The carry-over of an intermediate value as the new support point for the next level down and the resetting of the intermediate value to the support point for the same level continue successively. The maximum computation workload is essentially derived from the maximum number of function calculations $v_{k+1}=F(v_k,\text{const})$ between two consecutive output values and, thus, from the maximum number of values in c(i), i.e. 28=4·7 in the above example.

To enable any starting values N to be used, either the appropriate, required support points s(i) must be supplied, or the method can be started with $(2^b)^G$ and can be carried out up to the index i=N while the system is being initialized before it then continues with the method described above The computational workload can also be reduced with the aid of other support points per level or only for certain levels. The parameter b can also be adapted for a specified number of support points in such a way that the function value calculations per use authorization are minimized, which also serves to minimize the total number of function value calculations required by the system throughout the entire runtime. Finally, where there are support points with a negative index for which no function values can be calculated, a query can take place at i=0.

In order to reduce write operations while intermediate values are being saved, several buffers can be provided per level which are written to and read on a rotating basis and are, thus, designed as an FIFO memory.

The invention claimed is:

1. A use-authorization device for security-related applications, in particular access control to secure areas or for securing vehicles, with
a user-end key unit for generating consecutive, alternating user code information which has a sequence of consecutive function values $v_{i+1}=F(v_i,\text{const})$ for i=0, ..., N through the repeated use of a one-way function $F(v_i,\text{const})$, which function values are used in inverse order to the sequence formation to create the consecutive user code information; and
an application-end processing unit for determining actual authorization information which is dependent upon the user code information received from the key unit and for performing a use-authorization checking process by comparing this actual authorization information with the application-end desired authorization information, as well as for generating use-release information depending on the result of the comparison, wherein the desired authorization information has a function value $v_i$ which has been transferred from the user code information which had been processed during the previous positive use-authorization operation; characterized in that
there is a certain number of levels G provided from which a certain number of iterative function value calculations can be performed in each level by means of the one-way function $F(v_i,\text{const})$, and
there are $G=\lceil L(N)/b \rceil$ levels, wherein N is the starting value, L(N) is the number of bits required for representing N in the dual system and b is the basis.

2. A device as claimed in claim 1, characterized in that there is a support point s(i) where i=(1, ..., G) provided for each level.

3. A device as claimed in claim 2, characterized in that the values for the support points s(i) are determined from the equation $$s(i) = N - \sum_{j=1}^{i} (2^b)^j$$

4. A device as claimed in claim 2, characterized in that no function values can be calculated for support points with a negative index.

5. A device as claimed in claim 2, characterized in that the parameter b is adapted for a specified number of support points in such a way that the function value calculations per use authorization are minimized.

6. A device as claimed in claim 2, characterized in that, starting from the current support point s(i), there should be a certain number of function values calculated in each level in descending order and saved as intermediate values.

7. A device as claimed in claim 2, characterized in that an intermediate value for the support point in a level should be reset successively in this level once this intermediate value, as a new support point, has been transferred to the next level down.

8. A device as claimed in claim 1, characterized in that the starting value is $N=(2^b)^G$.

9. A device as claimed in claim 1, characterized in that the starting value is $N \in \{(2^b)^{G-1}, \ldots, (2^b)^G-1\}$.

10. A device as claimed in claim 1, characterized in that there were several buffers provided for saving intermediate values which are calculated from the function values.

11. A device as claimed in claim 10, characterized in that the buffers are FIFO memories.

* * * * *